United States Patent
Dawidziak et al.

(10) Patent No.: US 9,168,919 B2
(45) Date of Patent: Oct. 27, 2015

(54) HYBRID VEHICLE

(71) Applicant: AUDI AG, Ingolstadt (DE)

(72) Inventors: Johannes Dawidziak, Grossrinderfeld (DE); Steffen Clement, Neckarsulm (DE); Markus Schiefer, Lauffen (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 14/348,375

(22) PCT Filed: Sep. 21, 2012

(86) PCT No.: PCT/EP2012/003952
§ 371 (c)(1),
(2) Date: Mar. 28, 2014

(87) PCT Pub. No.: WO2013/045061
PCT Pub. Date: Apr. 4, 2013

(65) Prior Publication Data
US 2014/0248993 A1 Sep. 4, 2014

(30) Foreign Application Priority Data
Sep. 29, 2011 (DE) .......................... 10 2011 115 281

(51) Int. Cl.
*B60K 6/30* (2007.10)
*B60W 20/00* (2006.01)
(Continued)

(52) U.S. Cl.
CPC ................ *B60W 20/40* (2013.01); *B60K 6/105* (2013.01); *B60K 6/26* (2013.01); *B60K 6/30* (2013.01); *B60K 6/52* (2013.01); *B60K 6/547* (2013.01); *B60K 2006/4825* (2013.01); *B60Y 2400/15* (2013.01); *Y02T 10/6204* (2013.01);
(Continued)

(58) Field of Classification Search
CPC ... B60K 6/30; Y10T 477/639; Y02T 10/6204
See application file for complete search history.

(56) References Cited

U.S. PATENT DOCUMENTS 3,493,066 A 2/1970 Dooley
3,882,950 A 5/1975 Strohlein
(Continued)

FOREIGN PATENT DOCUMENTS

AT 147860 11/1936
DE 639 717 12/1936
(Continued)

OTHER PUBLICATIONS

International Search Report issued by the European Patent Office in International Application PCT/EP2012/003952 on Nov. 21, 2012.

*Primary Examiner* — Sherry Estremsky
(74) *Attorney, Agent, or Firm* — Henry M. Feiereisen LLC

(57) ABSTRACT

A hybrid vehicle includes a combustion engine (2) with a driveshaft (4) for driving the wheels of at least one axle (7), at least one electrical machine (11, 12) for driving the wheels of this axle or at least one other axle (10), with the at least one electrical machine capable of being operated as a generator during a braking process and as a motor during an acceleration process, and a further electrical machine (18) which is coupled to the at least one electrical machine and includes a flywheel store which has a rotor (14) and is chargeable during a braking operation and dischargeable during an acceleration process. The rotor (14) can be mechanically coupled via at least one shiftable clutch (23) to the driveshaft (4) of the at least one axle (7) which can be driven by the combustion engine.

12 Claims, 1 Drawing Sheet

(51) Int. Cl.
- *B60K 6/10* (2006.01)
- *B60K 6/26* (2007.10)
- *B60K 6/52* (2007.10)
- *B60K 6/547* (2007.10)
- *B60K 6/48* (2007.10)

(52) U.S. Cl.
CPC .......... *Y02T10/6252* (2013.01); *Y02T 10/6265* (2013.01); *Y02T 10/6282* (2013.01); *Y10S 903/96* (2013.01); *Y10T 477/26* (2015.01); *Y10T 477/639* (2015.01)

(56) References Cited

U.S. PATENT DOCUMENTS

| | | | |
|---|---|---|---|
| 4,233,858 A | 11/1980 | Rowlett | |
| 4,309,620 A | 1/1982 | Bock | |
| 4,588,040 A | 5/1986 | Albright, Jr. et al. | |
| 5,923,093 A * | 7/1999 | Tabata et al. | 290/40 C |
| 8,122,991 B2 * | 2/2012 | Roth | 180/165 |
| 8,180,511 B2 * | 5/2012 | Bowman et al. | 701/22 |
| 2006/0250902 A1 * | 11/2006 | Bender et al. | 369/1 |
| 2009/0020354 A1 | 1/2009 | Roth | |
| 2010/0184549 A1 | 7/2010 | Sartre et al. | |
| 2011/0106359 A1 | 5/2011 | Tanaka et al. | |
| 2011/0192666 A1 | 8/2011 | Schmid et al. | |

FOREIGN PATENT DOCUMENTS

| | | |
|---|---|---|
| DE | 1 812 480 | 9/1969 |
| DE | 24 36 546 | 2/1976 |
| DE | 27 57 619 | 6/1978 |
| DE | 102007033575 | 3/2009 |
| DE | 102010007632 | 8/2011 |
| WO | WO 2011/048133 | 4/2011 |

\* cited by examiner

HYBRID VEHICLE

CROSS-REFERENCES TO RELATED APPLICATIONS

This application is the U.S. National Stage of International Application No. PCT/EP2012/003952, filed Sep. 21, 2012, which designated the United States and has been published as International Publication No. WO 2013/045061 and which claims the priority of German Patent Application, Serial No. 10 2011 115 281.8, filed Sep. 29, 2011, pursuant to 35 U.S.C. 119(a)-(d).

BACKGROUND OF THE INVENTION

The invention relates to a hybrid vehicle including a combustion engine having a driveshaft for propelling the wheels of at least one axle, at least one electrical machine for propelling the wheels of this one or at least one further axle, with the at least one electrical machine capable of being operated during a braking operation as a generator and during an acceleration operation as a motor, and a further electrical machine coupled with the at least one electrical machine and having a flywheel store which includes a rotor and which can be charged during a braking operation and discharged during an acceleration operation.

The use of flywheels in vehicles has long been known. DE 639 717 A proposes the provision of a flywheel store for vehicles, with a shiftable transmission being arranged between the flywheel and the drive train of a vehicle. Instead of a mechanical range-change transmission, the use of an electrical gearbox is also possible.

AT 147 860 B discloses a flywheel store for motor vehicles. A combustion engine drives an axle as main propulsion; the flywheel store drives one or more additional drive axles.

DE 10 2010 007 632 A1 proposes a hybrid vehicle having a combustion engine for driving the rear axle, and two electrical machines at the front axle. The electrical machines are operated during braking operation as a generator to recover kinetic energy. The energy gained during recuperation is supplied to a flywheel intended as energy store. For this purpose, current which is generated by the electrical machine arranged on the front axle is fed to a third electrical machine which is arranged in the flywheel store so as to cause movement of a rotor of the flywheel store. This rotor can reach rotation speeds up to 40,000 1/min. The rotor provided in the hybrid vehicle is used as a mechanical energy storage so that the need for an electrochemical storage battery, like in other conventional hybrid vehicles, is eliminated. Following a braking operation, the recovered energy stored in the form of kinetic energy is available for an acceleration process. For that purpose, the third electrical machine of the flywheel store is operated as a generator, thereby producing electrical energy while slowing down the rotor, which electrical energy in turn is fed to the first and second electrical machines at the front axle. This electrical energy acts as additional driving energy to assist the combustion engine which drives the rear axle.

In order to improve efficiency and controllability, hybrid vehicles typically use an electric gearbox with at least one electrical machine or a CVT transmission (continuously variable transmission). However, both the electric gearbox and the CVT lead to a high system weight, when the power being transmitted is high. Therefore, only a limited proportion of the braking energy that actually occurs can be converted into kinetic energy. The major proportion of the braking energy is still wasted as heat. Many vehicles, such as buses, sanitation trucks or delivery vehicles are, however, operated to frequently decelerate and accelerate again. The same applies to motor sport vehicles and in general to vehicles in urban traffic.

SUMMARY OF THE INVENTION

The invention is therefore based on the object to provide a hybrid vehicle that allows the recuperation of a greater proportion of the braking energy.

This object is attained according to the invention by a hybrid vehicle of the aforementioned type in that the rotor can be coupled mechanically via at least one shiftable clutch with the driveshaft of the at least one axle that can be driven by the combustion engine.

The invention is based on the recognition that the recuperated braking energy can be increased by mechanically coupling the rotor of the flywheel store with the driveshaft of the axle driven by the combustion engine in addition to the energy supplied by the at least one electrical machine. In this way, a conventional hybrid vehicle is improved in a manner that allows recovery of a substantially greater proportion of the braking energy. In conventional hybrid vehicles in which electrical machines can be operated as a generator during the braking operation, the recoverable energy corresponds to the amount of electricity that can be produced regeneratively by the two electrical machines; this energy is, however, substantially less than the overall encountered braking energy and an increase in the amount of energy that can be recovered is not practical for weight reasons. Therefore, the energy available in conventional hybrid vehicles for acceleration approximately corresponds to the energy recuperated during the braking operation, except for conversion losses. In contrast thereto, the hybrid vehicle according to the invention is capable to recuperate a higher proportion of the braking energy by additionally accelerating the flywheel store mechanically via the driveshaft connected to the combustion engine.

In the hybrid vehicle according to the invention, the shiftable clutch can be constructed as a friction clutch. The friction clutch corresponds basically to a friction clutch that is used in vehicles with manual transmission. The provision of the shiftable clutch enables a connection of the driveshaft, connected to the combustion engine, with the flywheel store during a braking operation in order to additionally charge the flywheel store.

In the hybrid vehicle according to the invention, it is particularly preferred to arrange a shiftable transmission between the friction clutch and the driveshaft of the axle that is capable of being driven by the combustion engine and is connected to the combustion engine. Preferably, this involves a transmission that is anyway provided between the combustion engine and the driven axle.

An especially good efficiency is obtained when the flywheel store of the hybrid vehicle according to the invention is arranged in a sealed or sealable housing. As a result of the sealing, flow losses are prevented, which could be experienced otherwise in view of the high rotation speeds of the rotor.

To further improve the efficiency of the hybrid vehicle according to the invention, provision may be made for a vacuum pump to evacuate the housing in which the flywheel is accommodated. The controllable vacuum pump provides the option to hermetically seal off the flywheel so that the kinetic energy stored in the rotor can be maintained for a longer period; Otherwise, the ventilation of air would result in flow losses.

A still higher efficiency can be realized when the flywheel store includes an internal coupling. As a result, components, which are not required, can be disengaged in the charged state. This may involve electrical components of a further, in particular a third electrical machine, which is needed only in the motor mode, but not when charging the flywheel. In this context, it is particularly beneficial when a driveshaft that feeds into the housing of the flywheel can be sealed by a seal. Preferably, the seal is conical in shape and becomes effective when activating the internal coupling. The housing is then only sealed in this manner, when the coupling is open. The conically-shaped seal according to the invention replaces a radial shaft sealing ring that is prone to wear off.

In order to adjust the engine rotation speed to the rotation speed of the flywheel (before gearing), the hybrid vehicle according to the invention can be provided with a control device. By means of the control device, the transmission is shifted in stages, i.e., when the engine rotation speed has dropped during a braking operation to a certain level, the control device causes a shift to a lower gear in order to increase the engine rotation speed and to adjust it to the rotation speed of the flywheel before gearing. Preferably, the transmission is an automatic transmission, so that the shifting operations can be executed without the intervention of a user.

The further, in particular the third electrical machine, can include as part of the flywheel store the rotor and a stator, with either the rotor or the stator having permanent magnets. The respectively other component has field windings into which a voltage is induced in view of the rotation.

In the hybrid vehicle according to the invention, the shiftable friction clutch can be equipped with an antilock braking system. This ensures that the torque can be reliably transmitted from the driveshaft to the flywheel store.

In addition, the hybrid vehicle according to the invention can include an energy converter for converting kinetic energy during a braking operation from the driveshaft, coupled to the combustion engine, into pneumatic, hydraulic or electric energy and to supply it in this way the flywheel store. For example, the kinetic energy can be used for charging a compressed air reservoir by which a turbine, coupled to the flywheel, can be operated. In this manner, the flywheel can be accelerated by pneumatic energy. The flywheel store configured to generate pneumatic, hydraulic or electrical energy is preferably provided in addition to the mechanical drive but embodiments are also conceivable in which the acceleration of the flywheel is realized by pneumatic, hydraulic or electrical energy, instead of a mechanical coupling and energy transfer. The energy converter thus converts the kinetic energy of the driveshaft; the converted energy is being used for acceleration of the rotor during a braking operation.

With respect to the high powers to be transmitted by a driveshaft, provision may be made in the hybrid vehicle according to the invention for coupling the friction clutch to a heat exchanger. This heat exchanger is provided for dissipating heat generated in the clutch. Primarily, this heat is generated by the slippage of the clutch when the differences in the rotation speed between the two clutch sides are compensated. Preferably, the heat exchanger is constructed as an oil/coolant heat exchanger. The heat exchanger may be integrated into the cooling circuit of the combustion engine; the additional load due to the cooling of the friction clutch is not a problem, because the engine subjects the cooling circuit to less stress during a braking operation.

BRIEF DESCRIPTION OF THE DRAWING

Further advantages and details of the invention become apparent by way of an exemplary embodiment with reference to the drawings. The drawings are schematic illustrations and show in.

DETAILED DESCRIPTION OF PREFERRED EMBODIMENTS

Figure 1:
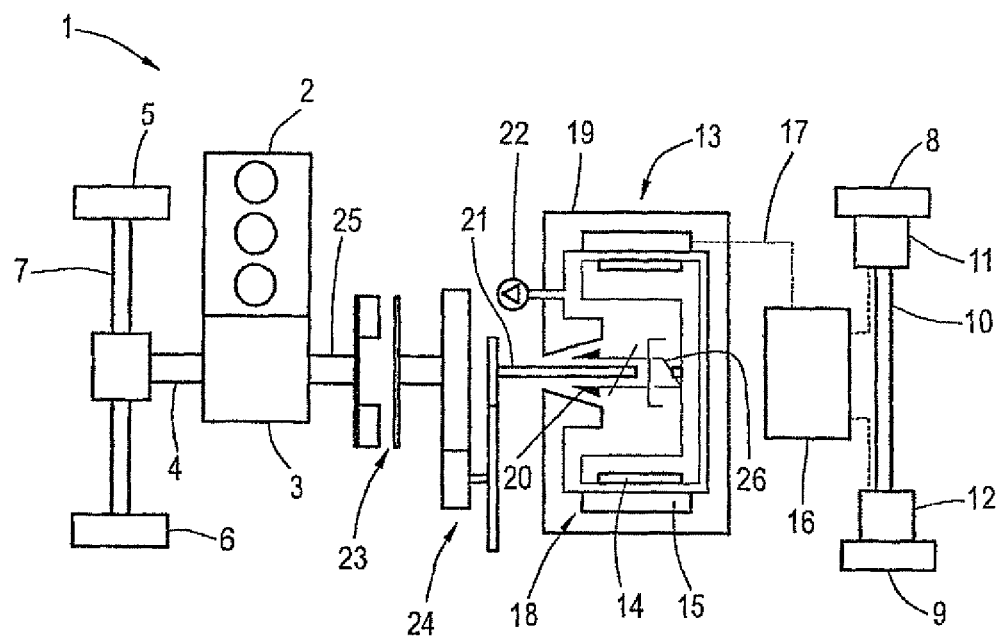
FIG. 1 the essential components of a hybrid vehicle according to the invention.

The hybrid vehicle 1 shown in FIG. 1 includes a combustion engine 2 which is connected to an automatic transmission 3. Wheels 5, 6 of a first axle 7 are driven by a driveshaft 4 connected to the automatic transmission 3. Wheels 8, 9 of a second axle 10 are driven by electrical machines 11, 12. During a braking operation, the electrical machines 11, 12 can be operated as a generator. As the wheels 8, 9 rotate, a voltage is generated during the regenerative mode; the generated electric current is used to charge a flywheel store 13. The flywheel store 13 includes a rotor 14 and a stator 15. Rotor 14 and stator 15 form together an electrical machine 18 which can be operated either as a generator or as a motor.

During a braking operation, a power electronics 16 controls the electrical machines 11, 12 of the second axle 10. The electric energy generated during the braking operation is supplied via a line 17 to the electrical machine 18 of the flywheel store 13 so that the rotor 14 is accelerated.

The flywheel store 13 is arranged in a housing 19 which can be sealed by a seal 20. The seal 20 is formed conically and seals the housing 19 with respect to a driveshaft 21. A vacuum pump 22 is able to evacuate the interior of the housing 19 when sealed so that flow losses are reduced. In addition to the described acceleration of the rotor 14 of the flywheel store 13, the rotor can be accelerated in addition mechanically by the driveshaft 21. The flywheel store 13 is selectively connected via a friction clutch 23 to a driveshaft 25 of the automatic transmission 3. During a braking operation, the rotor 14 can be coupled mechanically by the shiftable friction clutch 23 via the driveshaft 25 of the automatic transmission 3 to the driveshaft 4 of the first axle 7 so that the driveshaft 21, feeding into the housing 19 of the flywheel store 13, is accelerated. A gearing 24 is provided between the friction clutch 23 and the driveshaft 21. When initiating a braking operation, the friction clutch 23 is closed so that the driveshaft 21 and thus the rotor 14 of the flywheel store 13 are accelerated. The kinetic energy of the wheels 5, 6 of the first axle 7 is converted mechanically in this way into kinetic energy of the flywheel store 13. The rotor 14 is thus driven during a braking operation by the regenerative operation of the electrical machines 11, 12 of the second axle on one hand, and mechanically by the driveshaft 4. As a result, the rotor 14 can be supplied with a greater proportion of braking energy in comparison to a hybrid vehicle which uses only the braking energy of one axle.

Figure 2:
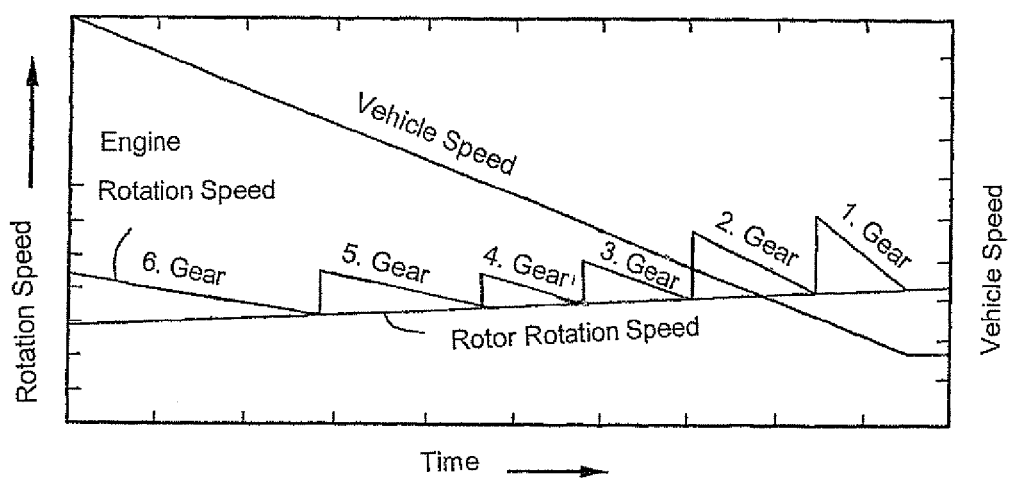
FIG. 2 a diagram in which the rotation speeds of the flywheel and the driveshaft as well as the vehicle speed during a braking operation are plotted over time.

FIG. 2 illustrates the described braking process over the time, with the vehicle speed, engine rotation speed and rotor rotation speed being qualitatively shown (before gearing). It can be seen that the vehicle speed is reduced approximately constant. At the beginning of the braking operation, the automatic transmission 3 is driven in the sixth gear; the engine rotor speed is higher at the beginning than the rotation speed of the rotor. A difference in the rotation speed is compensated by slippage on the friction clutch 23, which is heated thereby. Frictional heat is dissipated via a heat exchanger, with the clutch 23 running in an oil bath which is coupled to a cooling water circuit of the combustion engine 2.

FIG. 2 shows that the rotor rotation speed increases during the braking operation. When the engine rotation speed and the rotor rotation speed (before gearing) are the same, the rotor can no longer be accelerated. Then the automatic transmission 3 shifts to a lower gear, i.e., from the sixth gear to the fifth gear, so that the rotation speed of the driveshaft 25 is increased at the input side of the friction clutch 23. In this state, the rotor 14 continues to be accelerated. In analogous manner, a shift into lower gears is realized step-by-step until the rotor can no longer be accelerated in the first gear. These shifting operations of the automatic transmission 3 are triggered automatically by a control unit. In this state, the rotor 14 rotates the flywheel store 13 with a very high rotation speed. To minimize energy loss due to frictional effects, the housing 19 of the flywheel store 13 is sealed by the seal 20; the interior of the housing 19 is evacuated by the vacuum pump 22 so that the energy stored as kinetic energy in the rotor 14 can be maintained for a certain time. In this state, the friction clutch 23 is opened again. Likewise, an internal coupling 26 is opened inside of the flywheel store 13 so that components that are not needed are not driven.

During an acceleration operation, the kinetic energy stored in the rotor 14 can be used. In this operating mode, the third electrical machine 18, which includes the rotor 14 and the stator 15, is operated as generator so that the rotor 14 is decelerated. As a result of the regenerative operation, electric current is generated which is fed via the line 17 and the power electronics 16 to the electrical machines 11, 12. As a result, the wheels 8, 9 of the second axle are accelerated. This acceleration by electric energy acts in addition to the torque generated by the combustion engine 2 and is dissipated via the automatic transmission 3 and the driveshaft 4 to the first axle 7.

What is claimed is:

1. A hybrid vehicle, comprising:
   a combustion engine having a first driveshaft for propelling wheels of at least one axle;
   at least one first electrical machine for propelling the wheels of said at least one axle or wheels of at least one other axle, said first electrical machine being configured to operate during a braking operation as generator and during an acceleration operation as motor;
   a second electrical machine coupled to the first electrical machine and having a flywheel store which includes a rotor and which is capable of being charged during the braking operation and discharged during the acceleration operation,
   a shiftable clutch constructed as a friction clutch for mechanically coupling the rotor with the first driveshaft;
   a shiftable transmission arranged between the friction clutch and the first driveshaft and directly connected to the combustion engine; and
   a control device operably connected to the transmission to adjust an engine rotation speed during the braking operation.

2. The hybrid vehicle of claim 1, wherein the transmission is an automatic transmission.

3. The hybrid vehicle of claim 1, further comprising a sealed or sealable housing configured to accommodate the flywheel store.

4. The hybrid vehicle of claim 3, further comprising a vacuum pump configured to evacuate the housing.

5. The hybrid vehicle of claim 3, further comprising a second driveshaft sized to extend into the housing and operably connected to the rotor, and a seal for sealing the second driveshaft.

6. The hybrid vehicle of claim 5, wherein the seal has a cone-shaped configuration.

7. The hybrid vehicle of claim 1, wherein the flywheel store comprises an internal coupling for selectively disengaging a component of the flywheel store.

8. The hybrid vehicle of claim 1, wherein the second electrical machine comprises a stator interacting with the rotor, with either the rotor or the stator having permanent magnets.

9. The hybrid vehicle of claim 1, further comprising an energy converter configured to convert during a braking operation kinetic energy of the first driveshaft into pneumatic, hydraulic or electric energy for supply to the flywheel store.

10. The hybrid vehicle of claim 1, further comprising a turbine coupled with the flywheel store, and an energy converter configured to convert during a braking operation kinetic energy of the first driveshaft into pneumatic energy for supply to the turbine.

11. The hybrid vehicle of claim 1, further comprising a heat exchanger, said friction clutch being coupled to the heat exchanger.

12. The hybrid vehicle of claim 11, wherein the heat exchanger is an oil/cooling water heat exchanger.

* * * * *